Patented Apr. 8, 1941

2,237,344

UNITED STATES PATENT OFFICE 2,237,344

SEMISTIFF COLLAR

John Gwynant Evans, Blackley, Manchester, and Archibald Renfrew, Norton-on-Tees, England, assignors to Imperial Chemical Industries Limited, a corporation of Great Britain No Drawing. Application August 23, 1938,
Serial No. 226,383
In Great Britain August 26, 1937

1 Claim. (Cl. 154—46)

The present invention relates to the manufacture of composite, laminated, or stratified materials, of which at least one of the layers comprises knitted, matted or woven fabric, and the other layer or layers can be a further layer or layers of fabric or a continuous or discontinuous sheet, a block, or a shaped article of some solid substance.

By woven or knitted fabrics we mean fabrics which have been manufactured by weaving or knitting of natural cellulose or animal fibres or artificial fibres of regenerated celluloses, cellulose esters or ethers, or protein. By matted fabrics we mean fabrics such as paper or felt in the manufacture of which the primary fibres are deposited in the form of a mat or felt from suspension in a suitable carrying fluid which is then drained away. The interlocking between neighbouring fibres of a matted fabric thus arises from their random distribution which contrasts fundamentally with the organized interlinkage between neighboring threads of a woven or knitted fabric. The matted fabrics may likewise be composed of any of the above-mentioned animal or vegetable materials.

The solid substance to which the woven, knitted or matted fabric is caused to adhere may be metal, wood, synthetic or natural resin, leather, paper, cardboard, or a film or sheet of regenerated cellulose, cellulose ester or cellulose ether.

This invention has as an object to devise a new, efficient and economical method of bonding the layer of fabric to the other part of the composite material. A further object is to devise a new method of manufacturing such composite material. A still further object is to provide new laminated materials. A still further object is to provide new composite materials of which one layer is of fabric. Further objects will appear hereinafter. These objects are accomplished by the following invention.

We have found that an exceedingly satisfactory bond can be obtained between a fabric and another surface if there is placed between the surfaces to be joined, which are then subjected to heat and pressure, a layer comprising a normally solid polymer of ethylene of high molecular weight. The manufacture of such solid polymers is described in certain copending applications in the name of Perrin et al., now Patents 2,153,553, 2,188,465, and 2,200,429, and does not form a part of the present invention. Such polymers may contain a small amount of oxygen and those therein described which are tough solids at normal temperatures and have a molecular weight of at least 6000 are particularly suitable for laminating cloth layers. The polymerized ethylene portion of the polymer corresponds in composition substantially to $(CH_2)_x$.

The adhesive layer consists of a thin sheet of the polymerised ethylene or it consists of a sheet of woven, knitted or matted fabric, or a film of regenerated cellulose, impregnated with the polymerized ethylene.

An alternative method of carrying the invention into practical effect is to provide one or both of the surfaces which it is desired to cause to adhere with a coating of the polymerised ethylene, which may be applied to the said surface or surfaces in the form of an aqueous suspension or emulsion, or a solution in a suitable organic liquid, by any convenient means, such as back-filling, spraying or brushing. The coated surfaces are then placed in contact and the assemblage is subjected to the action of heat and pressure.

If the object is to provide a laminated fabric, for instance of the kind in which one outer layer is required to be bonded to another layer without any substantial alteration in its appearance (e. g. for making a suitable material for collars which match with the shirt, a layer of shirting being bonded to a layer of stiffer material) the layer comprising the ethylene polymer can be provided in several ways for instance:

1. As a solid film, which is sandwiched between two layers of fabric, the whole material being then formed into a composite multi-ply fabric by the application of heat and pressure as described; or 2. As a surface coating to one side of each of the fabrics to be united, the coated sides being then placed in contact and the union being effected by heat and pressure; or 3. As an impregnated or doubly coated fabric which is then used in a similar manner to that described above for the solid film.

Thus in forming a two-ply laminated fabric there may be applied to one side of each of the constituent fabrics one or more coatings of the polymerised ethylene, for example, by back-filling, spraying or brushing with a solution thereof in a suitable solvent or with an aqueous dispersion or emulsion thereof. The coatings are suitably dried, the coated sides of the fabrics are placed in contact and are then united by the application of heat and pressure.

Alternatively, by impregnating or coating on both sides a woven, knitted or matted fabric, or a film of regenerated cellulose, cellulose ester or ether, with a solution of the polymerised ethylene in a suitable solvent, or with an aqueous suspension or emulsion thereof, and suitably drying the so coated or impregnated fabric, a material is obtained which may be used as an interlayer. This interlayer, or a solid film of the polymerised ethylene, is then placed between two fabrics of the kind described and heat and pressure are applied.

While the above description relates to the production of an article composed of only two or three strata or laminae, it is to be understood that with suitable minor modifications the process may be made applicable to the production of articles comprising three or more strata or laminae and the invention comprises also the production of such multi-ply articles and materials.

The invention is illustrated but not limited by the following examples.

Example 1

A film of polymerised ethylene 0.15 mm. thick, is interposed between a layer of mercerised cotton poplin material and a sheet of regenerated cellulose. The assemblage is passed between calender rollers to which pressure is applied and which are maintained at a temperature of 140° C. There is thus obtained a composite material which has the appearance of a woven fabric of which one side has a very high lustre.

Example 2

Closely woven plain cotton cloth is bonded to aluminium foil 0.025 mm. thick by interposing between the layers a film of polymerised ethylene 0.1 mm. thick and subsequently passing the assemblage between heated rollers at a temperature of 140–150° C. There is thus obtained a composite material, presenting on the one side a metallic surface and on the other side a cloth surface. This material, which is of excellent pliability, can replace for many purposes metallic sheets of much greater thickness.

Example 3

A film of polymerised ethylene 0.2 mm. thick is interposed between a light cotton canvas material, and leather skiver, and the whole is passed between pressure rollers at 140–150° C. There is thus obtained a composite material which can be used instead of heavier and more costly leathers.

Example 4

A film of polymerised ethylene is placed between two pieces of mercerised cotton poplin shirting fabric. This assemblage is then ironed at a temperature of 150° C. under pressure. In this way a composite fabric is obtained which on cooling shows a high degree of resistance to separation of the individual layers, is flexible and does not readily come apart on laundering treatment.

If desired, plasticisers such as dibutyl phthalate, tricresyl phosphate and the like, may be added to the polymerised ethylene.

In addition, inorganic fillers such as China clay, barytes or lithopone, may be added to the polymerised ethylene to give body to the ultimate composite fabric.

Likewise, when using aqueous dispersions of the polymerised ethylene, suitable water-soluble substances, such as starches, gums, gelatine, glue or water-soluble cellulose derivatives, may be added to increase the viscosity of the emulsion or suspension and so obtain a greater loading of the impregnated material.

Multiple fabrics and laminated materials made in accordance with this invention are characterised by the tenacity of the bond, their pliability, and resistance to moisture. The layers are not readily loosened by laundering, and even if they do become separated by such process, they are simply and readily reunited by hot ironing or calendering.

As many apparently widely different embodiments of this invention may be made without departing from the spirit and scope thereof it is to be understood that the invention is not limited to the specific embodiments thereof except as defined in the appended claim.

We claim:

A collar comprising a face ply and a back ply firmly bonded together by means of a film of polymerised ethylene, said film being cementitious at temperatures above 150° C. and capable of rebonding the fabric plies when separated by ironing at about 150° C., the said polymerised ethylene characterized by being a tough solid at normal temperatures and corresponding in composition substantially to $(CH_2)_x$, and having a molecular weight of at least 6000.

JOHN GWYNANT EVANS.
ARCHIBALD RENFREW.